United States Patent
Kritt et al.

(10) Patent No.: US 10,133,873 B2
(45) Date of Patent: Nov. 20, 2018

(54) TEMPORARY CONCEALMENT OF A SUBSET OF DISPLAYED CONFIDENTIAL DATA

(75) Inventors: Barry A. Kritt, Raleigh, NC (US); Thomas S. Mazzeo, Durham, NC (US); Rodney E. Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1779 days.

(21) Appl. No.: 11/852,309

(22) Filed: Sep. 9, 2007

(65) Prior Publication Data

US 2009/0070594 A1 Mar. 12, 2009

(51) Int. Cl.
*G06F 21/62* (2013.01)

(52) U.S. Cl.
CPC .. *G06F 21/6209* (2013.01); *G06F 2221/2111* (2013.01)

(58) Field of Classification Search
CPC .............................. G06F 21/72; G06F 21/6209
USPC ............ 713/189, 193; 726/26; 715/216–218, 715/700, 764, 781; 345/619
See application file for complete search history.

(56) References Cited

U.S. PATENT DOCUMENTS

| | | | |
|---|---|---|---|
| 6,516,421 B1* | 2/2003 | Peters ............................. | 713/502 |
| 7,072,683 B2* | 7/2006 | King et al. .................. | 455/550.1 |
| 7,162,263 B2* | 1/2007 | King et al. .................. | 455/550.1 |
| 7,454,700 B1* | 11/2008 | Jones et al. .................... | 715/255 |
| 2003/0133569 A1* | 7/2003 | Stern et al. .................... | 380/206 |
| 2003/0142133 A1* | 7/2003 | Brown et al. ................. | 345/768 |
| 2004/0103202 A1* | 5/2004 | Hildebrand ......... | G06F 21/6209 709/229 |
| 2004/0193910 A1 | 9/2004 | Moles | |
| 2005/0015723 A1* | 1/2005 | Light et al. .................... | 715/540 |
| 2005/0038756 A1 | 2/2005 | Nagel | |

(Continued)

FOREIGN PATENT DOCUMENTS

| EP | 1513075 A2 | 9/2005 |
|---|---|---|
| EP | 1679604 A1 | 12/2006 |

(Continued)

OTHER PUBLICATIONS

HweeHwa Pang e al. "StegFS: A Steganographic File System," Computer Society IEEE, pp. 657-667 (Year: 2003).*

(Continued)

*Primary Examiner* — Luu T Pham
*Assistant Examiner* — Canh Le
(74) *Attorney, Agent, or Firm* — Steven M. Greenberg, Esq.; CRGO Law

(57) ABSTRACT

The present invention addresses the deficiencies of the art in respect to data security control and provides a method, system and computer program product for securing confidential data through transient on-demand data security control. In one embodiment of the invention, a method of securing confidential data can be provided. The method can include decrypting confidential data in a document, determining a subset of the confidential data specified by an author of the document, rendering a view of the confidential data including the subset, and, in response to detecting when an authorized viewer of the document no longer views the document, concealing the subset of the confidential data while maintaining a view of the confidential data not included in the subset.

15 Claims, 2 Drawing Sheets

(56) References Cited

U.S. PATENT DOCUMENTS

| | | | |
|---|---|---|---|
| 2005/0091499 A1* | 4/2005 | Forlenza et al. | 713/176 |
| 2005/0235163 A1* | 10/2005 | Forlenza et al. | 713/193 |
| 2005/0246526 A1* | 11/2005 | Forlenza et al. | 713/165 |
| 2006/0041751 A1 | 2/2006 | Rogers et al. | |
| 2006/0044290 A1* | 3/2006 | Hurwitz et al. | 345/204 |
| 2006/0080619 A1* | 4/2006 | Carlson et al. | 715/781 |
| 2006/0117016 A1 | 6/2006 | Smith et al. | |
| 2006/0129948 A1* | 6/2006 | Hamzy et al. | 715/790 |
| 2006/0168075 A1 | 7/2006 | Kitada et al. | |
| 2007/0143700 A1* | 6/2007 | Fukada | 715/768 |
| 2008/0013727 A1* | 1/2008 | Uemura | 380/243 |
| 2008/0065737 A1* | 3/2008 | Burke | G06F 17/30035 709/217 |
| 2008/0235221 A1* | 9/2008 | Burns et al. | 707/6 |
| 2009/0150761 A1* | 6/2009 | Sawicki et al. | 715/216 |

FOREIGN PATENT DOCUMENTS

| | | | |
|---|---|---|---|
| JP | 2005174211 A2 | 6/2005 | |
| WO | 0022810 A1 | 4/2000 | |

OTHER PUBLICATIONS

Sascha Muller, "A New DRM Architecture With Strong Enforcement," 2010 International Conference on Availability and Security, Computer Society IEEE, pp. 397-403. (Year: 2010).*

* cited by examiner

TEMPORARY CONCEALMENT OF A SUBSET OF DISPLAYED CONFIDENTIAL DATA

BACKGROUND OF THE INVENTION

Field of the Invention

The present invention relates to data security control as applied to confidential data.

Description of the Related Art

In the electronic age, security of confidential information remains a vital concern for any entity that creates and stores sensitive information, or transmits it across both secure and insecure networks alike. Often there has been a need to protect confidential information from 'prying eyes' that are not authorized to access this confidential information. One way to secure confidential information is through cryptography. The purpose of cryptography is to make data storage and transmission secure.

In cryptography, security is achieved by means of encryption which can include converting plain text into a data stream that appears like a random sequence of bits. There are several methods and products for encrypting documents. Conventional products verify a user's authorization, or use public/private encryption keys, or use password protection, to name a few techniques. As a next step, confidential encrypted data can be decrypted and displayed for use by an authorized user.

Despite the promise of cryptography, vulnerability comes into play after decryption has been implemented since some portions of a decrypted document or secure webpage with confidential data are difficult to protect from 'prying eyes' or unauthorized users. In this regard, confidential data including social security numbers, medical information and account numbers are at risk of being viewed by others that may manage to 'trespass', 'steal' or access an authorized user's confidential data. Especially in public locations where unauthorized users may have a greater opportunity to view confidential information after it has been decrypted by an authorized user, there is a need to solve this vulnerability issue of securing data when data may be unattended or easily stolen.

Current methods attempt to solve this data vulnerability issue by offering users with privacy filters for computer displays that physically block any unauthorized view of confidential information displayed on a user's monitor. However, privacy filters can only protect a side view of a display from intrusion of 'prying eyes.' Thus, confidential data remains vulnerable. Another current method provides a software based solution in which a screensaver will replace all of the content of the computer display with a picture or other content after a fixed period of time. This does not protect the confidential data during the time the authorized user is actively using the computer, and during the time delay period before the screensaver obscures the view of the confidential data.

SUMMARY OF THE INVENTION

The present invention addresses the deficiencies of the art in respect to data security control and provides a novel and non-obvious method, system, apparatus and computer program product for securing confidential data through transient on-demand data security control. In one embodiment of the invention, a method of securing confidential data can be provided. The method can include decrypting confidential data in a document, determining a subset of the confidential data specified by an author of the document, rendering a view of the confidential data including the subset, and, in response to detecting when an authorized viewer of the document no longer views the document, concealing the subset of the confidential data while maintaining a view of the confidential data not included in the subset.

In one aspect of the embodiment, rendering a view of the confidential data including the subset can include rendering different data fields with different portions of the confidential data in the different data fields. As such, concealing the subset of the confidential data while maintaining a view of the confidential data not included in the subset, can include concealing confidential data in the subset in respective ones of the different data fields while maintaining a view to others of the different data fields including the confidential data not included in the subset. In another aspect of the embodiment, concealing the subset of the confidential data while maintaining a view of the confidential data not included in the subset can include determining a location for an authorized viewer of the confidential data, and withholding the concealing of the subset if a secure user location is determined, but otherwise permitting the concealing of the subset.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product securing confidential data through transient on-demand data security control. In an embodiment of the invention, a user can be authenticated and after successfully decrypting a confidential file, the user can be given an option for selective data security control to conceal all confidential data, to show all of the confidential data or to selectively show a subset of the confidential data. Thereafter, when not actively accessing a confidential data field, the confidential data field can be concealed from unauthorized access according to the selected option.

Figure 1:
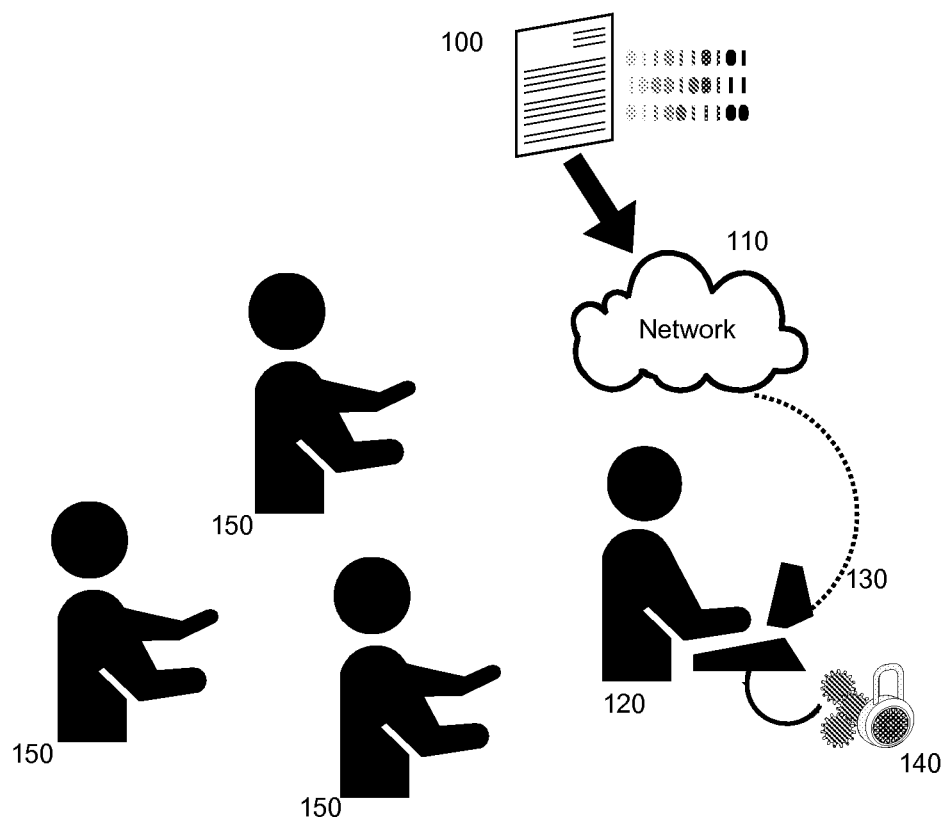
FIG. 1 is a pictorial illustration of a transient on-demand data security control system.

In illustration, FIG. 1 pictorially depicts a transient on-demand data security control system. As shown in FIG. 1, an author that has created a confidential document can encrypt the document 100 with specified user control levels. The control levels can be set to determine which data fields can be revealed and concealed by an authorized user. After the document has been optionally transmitted over a data network 110, an authorized user 120 can access the confidential document through a computer 130 enabled for transient on-demand data security control process 140. Consequently, unauthorized users with prying eyes 150 around the vicinity of the authorized user 120 can be prevented from accessing or viewing confidential data fields.

Figure 2:
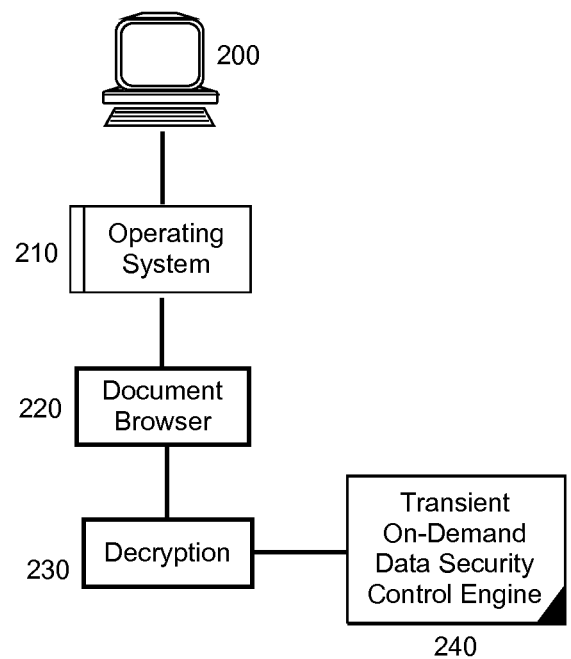
FIG. 2 is a schematic illustration of a decryption data processing system configured for transient on-demand data security control; and, FIG. 3 is a flow chart illustrating a process for transient on-demand data security control.

In further illustration, FIG. 2 schematically depicts a decryption data processing system configured for transient on-demand data security control. The system can include a host computing platform 200. The platform 200 can be coupled to an operating system 210 which in turn can support the operation of a document browser 220, for example a web browser, or spreadsheet. Document decryption module 230 can be coupled to the document browser 220 and configured to decrypt documents and data for display in document browser 220. Finally, a transient on-demand data security control engine 240 can be coupled to document decryption module 230. The transient on-demand data security control engine 240 can include program code enabled to selectively allow a user to conceal confidential data fields in a confidential document.

Figure 3:
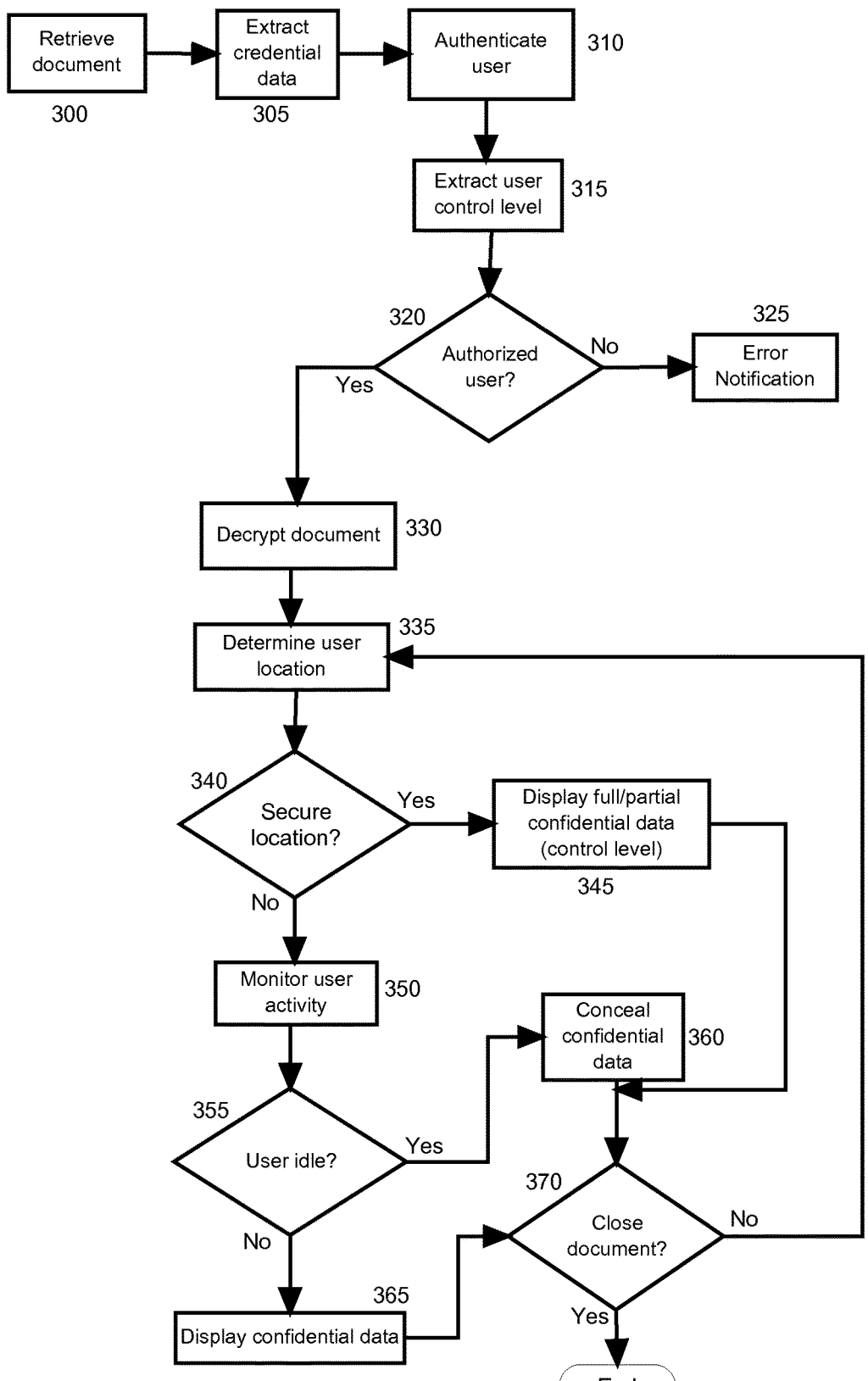

Specifically, in reference to FIG. 3, in block 300, a user can retrieve a confidential document and in block 305, credential data can be extracted therefrom. In block 310 a requesting user can be authenticated and in block 315, a user control level can be extracted from the extracted credential data. In this regard, the author of the confidential document can set different user control levels to allow different options of data security control. The user control levels can be provided by the author in conjunction with the credential data for the confidential document.

In decision block 320, if a user cannot present a valid password, certificate or public/private key, then an error message and unauthorized user notification can be sent in block 325 to prevent decryption of confidential data and any access to confidential data can be restricted completely. Otherwise, in block 330 the confidential data can be decrypted. Confidential data fields can be hidden by default unless an authorized user makes it viewable.

An authorized user can make data fields viewable if the author has previously set permission given by user control levels. In block 335, the user's location can be determined. In decision block 340, if the authorized user is in a secure location such as a private office with no risk of unauthorized viewers, then a selected portion or all of the confidential data can be displayed 345 depending on user control level given by the original author of the confidential document. If the authorized user is not in a secure location, the user's activity can be monitored 350.

In decision block 355, if the authorized user is not actively accessing or viewing confidential data, then in block 360, confidential data field can be concealed. The process can end when the document is closed by the authorized user if decision block 370 is yes. As long as the document is open, decision block 370 will feed back into block 335 to continue the steps of transient on-demand data security control.

If the authorized user is actively accessing confidential data fields, then in block 365 the confidential data fields can be displayed temporarily as long as the user is actively viewing it or as long as a time-out has not occurred. Actively viewing confidential fields can include hovering, right mouse clicking, or highlighting a field. Further protection can be provided by setting a time-out value which can control the maximum time a confidential data field can be 'actively viewed.' After this time-out occurs, the confidential data field can return to concealed mode to prevent unauthorized access.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method of securing confidential data comprising:
   decrypting in memory of a computer confidential data in a document;

determining by a processor of the computer a subset of the decrypted confidential data specified by an author of the document;

rendering in a display of the computer a view of the decrypted confidential data including the subset of the decrypted confidential data by rendering different data fields with different portions of the confidential data in the different data fields;

determining a geographic location of the computer; and, on condition that the geographic location is within an area pre-specified as a secure location, continuing to display the document in the display, but on condition that the geographic location is not within the area pre-specified as a secure location, further determining when a mouse pointer hovers over the subset of the decrypted confidential data and displaying the subset of the decrypted confidential data in the display only until it is determined that the mouse pointer no longer hovers over the subset of the decrypted confidential data, or when a time-out has occurred, whichever comes first, and thereafter concealing in the display the subset of the decrypted confidential data by concealing confidential data in the subset in respective ones of the different data fields, but while the subset of the decrypted confidential data is concealed, continuing to display in the display a view of the decrypted confidential data not included in the subset of the decrypted confidential data.

2. The method of claim 1, wherein the rendering the different data fields includes rendering selected ones of the different data fields with different portions of the confidential data in the different data fields in response to detecting individual right-mouse clicks on the selected ones of the different data fields.

3. The method of claim 1, wherein the rendering the different data fields includes rendering selected ones of the different data fields with different portions of the confidential data in the different data fields in response to detecting individual a highlighting of the selected ones of the different data fields.

4. The method of claim 1, wherein the rendering the different data fields includes rendering selected ones of the different data fields with different portions of the confidential data in the different data fields in response to detecting individual hovering of a pointer over the selected ones of the different data fields.

5. The method of claim 1, wherein the rendering the different data fields includes rendering selected ones of the different data fields with different portions of the confidential data in the different data fields in response to detecting the provisioning of a secure password for the selected ones of the different data fields.

6. The method of claim 1 wherein the concealing the subset of the confidential data comprises:

determining a location for an authorized viewer of the confidential data; and, withholding the concealing of the subset if a secure user location is determined, but otherwise permitting the concealing of the subset.

7. The method of claim 6, wherein
the detecting when the authorized viewer of the document no longer views the document, comprises:
monitoring user-computer interactions; and
determining that the authorized viewer no longer views the document after a monitored period of user inactivity.

8. A decryption data processing system comprising:
a host computing platform comprising at least one processor and memory;
an operating system coupled to the host computing platform;
a document browser executing in the operating system;
a decryption module coupled to the document browser; and,
a transient on-demand data security control engine coupled to the decryption module, the engine comprising program code enabled to
decrypt confidential data in a document, to
determine a subset of the decrypted confidential data specified by an author of the document, to
render a view of the decrypted confidential data including the subset of the decrypted confidential data in the browser by rendering different data fields with different portions of the confidential data in the different data fields,
determine a geographic location of the computer; and,
on condition that the geographic location is within an area pre-specified as a secure location, continue to display the document in the display, but on condition that the geographic location is not within the area pre-specified as a secure location, further determine when a mouse pointer hovers over the subset of the decrypted confidential data and display the subset of the decrypted confidential data in the display only until it is determined that the mouse pointer no longer hovers over the subset of the decrypted confidential data, or when a time-out has occurred, whichever comes first, and thereafter
to
conceal the subset of the confidential data by concealing confidential data in the subset in respective ones of the different data fields, but to otherwise continue to display a view of the decrypted confidential data not included in the subset of the decrypted confidential data while the subset of the decrypted confidential data is concealed.

9. A computer program product comprising a non-transitory computer usable storage medium having stored therein computer usable program code for securing confidential data, the computer usable program code, which when executed by a computer hardware system, causes the computer hardware system to perform
decrypting confidential data in a document;
determining a subset of the decrypted confidential data specified by an author of the document;
rendering a view of the decrypted confidential data including the subset of the decrypted confidential data;
determining a geographic location of the computer by rendering different data fields with different portions of the confidential data in the different data fields; and,
on condition that the geographic location is within an area pre-specified as a secure location, continuing to display the document in the display, but on condition that the geographic location is not within the area pre-specified as a secure location, further determining when a mouse pointer hovers over the subset of the decrypted confidential data and displaying the subset of the decrypted confidential data in the display only until it is determined that the mouse pointer no longer hovers over the subset of the decrypted confidential data, or when a time-out has occurred, whichever comes first, and thereafter concealing in the display the subset of the decrypted confidential data by concealing confidential data in the subset in respective ones of the different data fields, but while the subset of the decrypted confidential data is concealed, continuing to display in the display a view of the decrypted confidential data not included in the subset of the decrypted confidential data.

10. The computer program product of claim 9, wherein the rendering the different data fields includes rendering selected ones of the different data fields with different portions of the confidential data in the different data fields in response to detecting individual right-mouse clicks on the selected ones of the different data fields.

11. The computer program product of claim 9, wherein the rendering different data fields includes rendering selected ones of the different data fields with different portions of the confidential data in the different data fields in response to detecting individual a highlighting of the selected ones of the different data fields.

12. The computer program product of claim 9, wherein the rendering different data fields includes rendering selected ones of the different data fields with different portions of the confidential data in the different data fields in response to detecting individual hovering of a pointer over the selected ones of the different data fields.

13. The computer program product of claim 9, wherein the computer usable program code for rendering different data fields includes rendering selected ones of the different data fields with different portions of the confidential data in the different data fields in response to detecting the provisioning of a secure password for the selected ones of the different data fields.

14. The computer program product of claim 13 wherein the concealing the subset of the confidential data comprises:
    determining a location for an authorized viewer of the confidential data; and
    withholding the concealing of the subset if a secure user location is determined, but otherwise permitting the concealing of the subset.

15. The computer program product of claim 14, wherein the detecting when the authorized viewer of the document no longer views the document, comprises:
    monitoring user-computer interactions; and
    determining that the authorized viewer no longer views the document after a monitored period of user inactivity.

* * * * *